United States Patent [19]

Los

[11] 3,761,514
[45] Sept. 25, 1973

[54] dl-DODECAHYDRO-8β-(t-BUTOXY OR BENZYLOXY)-8aβ-LOWER ALKYL-2-OXO-PHENANTHRENE-ALKANOIC ACIDS

[75] Inventor: Marinus Los, Trenton, N.J.

[73] Assignee: American Cyanamid Company, Stamford, Conn.

[22] Filed: Jan. 6, 1969

[21] Appl. No.: 789,421

Related U.S. Application Data

[62] Division of Ser. No. 372,690, June 4, 1964, Pat. No. 3,446,849.

[52] U.S. Cl. .............................................. 260/514.5
[51] Int. Cl. ............................................... C07c 61/32
[58] Field of Search ................................. 260/514.5

[56] References Cited
UNITED STATES PATENTS
2,836,616   5/1958   Farrar .................................. 260/468

Primary Examiner—Lorraine A. Weinberger
Assistant Examiner—Robert Gerstl
Attorney—Edward A. Conroy, Jr.

[57] ABSTRACT

This disclosure describes compounds of the class of dl-2,3,4,4aβ,4bα,5,6,7,8,8a,9,10-dodecahydro-8aβ-lower alkyl--8β-(t-butoxy or benzyloxy)-2-oxo-1-substituted-phenanthrenes useful as intermediates in the synthesis of biologically active steroid moieties.

2 Claims, No Drawings

DL-DODECAHYDRO-8β-(T-BUTOXY OR BENZYLOXY)- 8Aβ-LOWER ALKYL-2-OXO-PHENANTHRENE-ALKANOIC ACIDS

CROSS REFERENCE TO RELATED APPLICATION

This application is a division of my copending application Ser. No. 372,690, filed June 4, 1964 now Patent No. 3446849.

BRIEF SUMMARY OF THE INVENTION

This invention relates to new organic compounds and, more particularly, it relates to novel compounds useful in the synthesis of a biologically active steroid moiety.

The compounds of the present invention may be illustrated by the following formula:

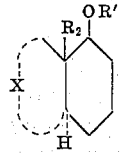

wherein R' is selected from the group consisting of benzyl and tertiary butyl, $R_2$ is lower alkyl and X is selected from the group consisting of

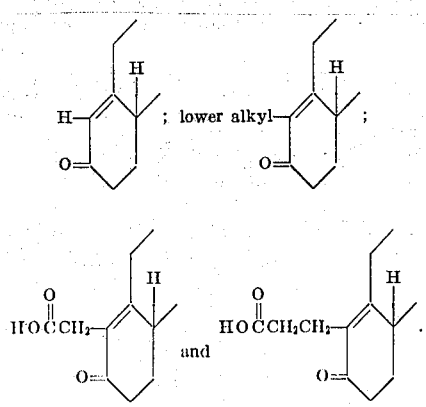

DETAILED DESCRIPTION OF THE INVENTION

The compounds of the present invention are usually viscous oils or crystalline solids.

Among the compounds within the scope of the present invention are the following: dl-8β-t-butoxy-8aβ-methyl-4,4aβ,-4bα,5,6,7,8,8a,9,10-decahydro-2(3H)-phenanthrone; dl-8β-t-butoxy-8aβ-ethyl-4,4aβ,4bα,5,6,7,8,8a,9,10-decahydro-2(3H)-phenanthrone; dl-8β-benzyloxy-8aβ-methyl-4,4aβ,4bα,5,6,7,8,8a,9,10-decahydro-2(3H)-phenanthrone; dl-8β-benzyloxy-8aβ-ethyl-4,4aβ,-4bα,5,6,7,8,8a,9,10-decahydro-2(3H)-phenanthrone; dl-8β-benzyloxy-2,3,4,4aβ,4bα,5,6,7,8,8a,9,10-dodecahydro-8aβ-methyl-2-oxo-phenanthrene-1-propionic acid; dl-8β-t-butoxy-2,3,4,4aβ,4bα,-5,6,7,8,8a,9,10-dodecahydro-8aβ-methyl-2-oxo-phenanthrene-1-propionic acid; dl-8β-benzyloxy-2,3,4,4aβ,4bα, 5,6,7,8,8a,9,10-dodecahydro-8aβ-ethyl-2-oxo-phenanthrene-1-propionic acid; dl-8β-t-butoxy-2,3,4,4aβ,4bα,5,6,7,8,a,9,10-dodecahydro-8aβ-ethyl-2-oxo-phenanthrene-1-propionic acid; dl-8β-t-butoxy-1,-8aβ-dimethyl-4,4aβ,4bα,5,6,7,8,8a,9,10-decahydro-2(3H)-phenanthrone; dl-8β-t-butoxy-8aβ-ethyl-1-methyl-4,4aβ,4bα,5,6,7,8,8a,9,10-decahydro-2(3H)-phenanthrone; dl-8β-benzyloxy-1,8aβ-dimethyl-4,4aβ,4bα,5,6,7,8,8a,9,10-decahydro-2(3H)-phenanthrone; dl-8β-benzyloxy-8aβ-ethyl-1-methyl-4,4aβ,4bα,5,6,7,8,8a,9,10-decahydro-2(3H)-phenanthrone and the like.

The present compounds are prepared by using starting materials such as, for example, 2-lower alkylcyclohexane-1,3-dione (compound I) in the flowsheet hereinafter which is reacted with methylvinyl ketone in the presence of an alkali metal hydroxide in alcohol and adding to this mixture benzene and pyrrolidine to form a 1,6-dioxo-$\Delta^{5(10)}$-9-lower alkyloctalin (II). This material (II) is separated from the mixture and then treated with sodium borohydride (preferably purified) in alcohol, preferably ethanol, to form a 1-hydroxy-6-oxo-$\Delta^{5(10)}$-9-lower alkyloctalin (III) which is separated from the mixture. This product (III) is then converted to 1-acyloxy-6-oxo-$\Delta^{5(10)}$-9-lower alkyloctalin (IV) by reaction of said material (compounds III) with an acyl halide or an acyl anhydride, preferably acetic anhydride, and pyridine. This material (compounds IV) is then separated from the reaction mixture. Reaction of 1-acyloxy-6-oxo-9-lower alkyl-$\Delta^{5(10)}$-octalin (IV) with a lower alkyl orthoformate, preferably ethyl orthoformate, in the presence of a strong acid catalyst will form new enol ethers. For example, when ethyl orthoformate is used in the above reaction, 1-acyloxy-6-ethoxy-9-lower alkyl- $\Delta^{4(10),5}$-hexahydronaphthalene is formed in quantitative yield. The crude enol ether (V) 1-acyloxy-6-lower alkoxy-9-lower alkyl-$\Delta^{4(10),5}$-hexahydronaphthalene may then be hydrogenated catalytically to the new compound 1-acyloxy-6-lower alkoxy-9-lower alkyl-trans-$\Delta^6$-octalin (VI), which without purification, is warmed with 50% aqueous acetic acid to give 1-acyloxy-6-oxo-9-lower alkyl-trans-decalin (VII). The subject matter shown hereinafter in the flowsheet as compounds IV through VII is described and claimed in my copending application Ser. No. 360,404, filed Apr. 16, 1964, now U.S. Pat. No. 3,331,856.

The 1-acyloxy-6-oxo-9-lower alkyl-trans-decalin compound (VII) when refluxed with ethylene glycol and p-toluene-sulphonic acid in a solvent, yields 1-acyloxy-6,6-ethylenedioxy-9-lower alkyl-trans-decalin (XII) which in turn is readily converted to 6,6-ethylenedioxy-1-hydroxy-9-lower alkyl-trans-decalin (XIII) by refluxing with an alcoholic solution of an alkali metal hydroxide, preferably ethanolic potassium hydroxide.

When a 1-hydroxy-6,6-ethylenedioxy-9-lower alkyl-trans-decalin (compound XIII) is heated with benzyl chloride and sodium hydride, an excellent yield of the 1-benzyloxy (compound XIV) derivative is formed. As an example, 1-hydroxy-6,6-ethylenedioxy-9-methyl-trans-decalin with benzyl chloride and sodium hydride yields 1-benzyloxy-6,6-ethylenedioxy-9-methyl-trans-decalin.

Hydrolysis of the 6,6-ethylenedioxy ketal function (compounds XIV) is readily accomplished by warming the ketal with aqueous acetic acid. Mineral acids in an organic solvent miscible with water can also be used. As a specific example, when 1-benzyloxy-6,6-ethylenedioxy-9-methyl-trans-decalin (compound XIV) is warmed with 30% aqueous acetic acid, the product obtained in excellent yield is 1-benzyloxy-6- oxo-9-methyl-trans-decalin (compound XV).

When the compounds, represented by formula (XV), in an inert solvent, preferably chloroform, are treated with bromine in the same solvent, an excellent yield of the corresponding bromo derivative (XVI) is formed. As a specific example, when 1-benzyloxy-6-oxo-9-methyl-trans-decalin is treated with bromine in chloroform, a good yield of 1-benzyloxy-7-bromo-6-oxo-9-methyl-trans-decalin is formed.

The bromo compounds (XVI) are dehydrobrominated in excellent yields by heating under reflux a solution of (XVI) in dry dimethylformamide containing anhydrous lithium halide, preferably lithium chloride, and anhydrous lithium carbonate in an inert atmosphere. Such reaction yields, for example, 1-benzyloxy-6-oxo-9-lower alkyl-Δ⁷-trans-octalin (XVII). For example, when 1-benzyloxy-7-bromo-6-oxo-9-methyl-trans-decalin is dehydrobrominated in dimethylformamide in the presence of lithium chloride and lithium carbonate, an excellent yield of 1-benzyloxy-6-oxo-9-methyl-Δ⁷-trans-octalin is formed.

By the different route, the 1-acyloxy-6-oxo-9-lower alkyl-trans-decalins (VII) of the general formula:

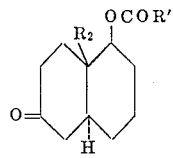

wherein $R_2$ is lower alkyl and $R'$ is selected from the group consisting of hydrogen, lower alkyl, phenyl and substituted phenyl radicals (i.e. tolyl, halophenyl, and the like), is dissolved in an inert solvent, preferably chloroform, bromine, preferably dissolved in the same solvent, is then admixed with this solution to yield the corresponding bromo derivative, for example, 1-lower alkanoyloxy-7-bromo-6-oxo-9-lower alkyl-trans-decalin (VIII).

Dehydrobromination of this product is carried out by heating a solution of product (VIII) in dimethylformamide with a lithium halide, preferably lithium chloride, and preferably in the presence of lithium carbonate, thereby yielding the corresponding Δ⁷ derivative (IX). Hydrolysis of this latter product (IX) is carried out with a weak base, preferably potassium bicarbonate, a mixture of water and an inert organic solvent, preferably ethanol, miscible with water to yield the corresponding 1-hydroxy derivative (X) of the flowsheet hereinafter.

The 1-t-butoxy-6-oxo-9-lower alkyl-Δ⁷-trans-octalin (XI) is formed by reaction of the above-identified 1-hydroxy derivative (X) with isobutylene in an inert solvent, preferably methylene chloride, in the presence of a strong acid catalyst, preferably phosphoric acid-boron trifluoride.

The compounds (VIII through XI) in the flowsheet hereinafter are described and claimed in my copending application Ser. No. 372,688, filed June 4, 1964, now U.S. Pat. No. 3,321,511, and compounds (XIV through XVII) in my copending application Ser. No. 372,716, filed June 4, 1964, now U.S. Pat. No. 3,321,488.

The compound

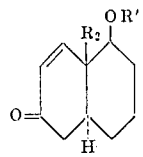

wherein $R'$ and $R_2$ are as defined above is compound (XVIII), generic to (XVII and XI) as shown in the flowsheet, can be transformed by condensation with an alkyl formate, preferably ethyl formate, in the presence of an alkali metal alkoxide, preferably sodium methoxide, in an inert solvent, preferably benzene, to the product (XIX). As a specific example, 1-t-butoxy-6-oxo-9-methyl-Δ⁷-trans- octalin with ethyl formate and sodium methoxide in benzene gives an excellent yield of trans-1,2,4a,5,6,7,8,8a-octahydro-4a-methyl-5-t-butoxy-2-oxo-1-naphthaldehyde represented generically by (XIX).

These compounds may be represented by the formula:

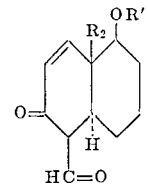

wherein $R'$ is selected from the group consisting of benzyl and tertiary butyl and $R_2$ is lower alkyl.

When compound (XIX) is reacted with $\alpha,\beta$-unsaturated ketones, preferably vinyl ketones, in the presence of an alkali metal alkoxide, preferably potassium-t-butoxide, in an inert solvent, preferably t-butanol, under an inert atmosphere, there is formed a compound of the formula (XX) in good yield which may be illustrated as follows:

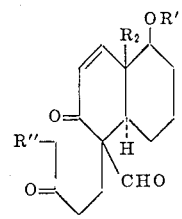

wherein $R_2$ is lower alkyl, $R'$ is selected from the group consisting of t-butyl and benzyl and $R''$ is selected from the group consisting of hydrogen, lower alkyl, lower alkyl acetate and lower alkyl propionate. As specific examples, when the compound trans-1,2,4a,5,6,7,8,8a-octahydro-4a-methyl-5-t-butoxy-2-oxo-1-naphthaldehyde is treated with methylvinyl ketone in t-butanol containing potassium t-butoxide, there is obtained trans-1,2,4a,5,6,7,8,8a-octahydro-4a-methyl-5-t-butoxy-2-oxo-1-(3-oxobutyl)-1-naphthaldehyde. When methyl 5-oxo-6-heptenoate is employed, then the product is methyl trans-1-formyl-1,-2,4a,5,6,7,8,8a-octahydro-4a-methyl-5-t-butoxy-δ,2-dioxo-1-naphthaleneheptanoate. When the corresponding benzylether of (XIX) is used, then the products are the corresponding benzyl derivatives. Similarly, when lower alkyl-4-oxo-5-hexenoate is used in the reaction $R''$ is lower alkyl acetate in compounds represented by generic formula (XX).

The conversion of compounds represented by (XX) is readily accomplished by treating a solution of (XX) in a water-miscible organic solvent, preferably dioxane, with an aqueous solution of an alkali metal hydroxide, preferably sodium hydroxide, in an inert atmosphere. As a specific example, methyl trans-1-formyl-1,2,4a,5,6,7,8,8a-octahydro-4a-methyl-5-benzyloxy-δ,2-dioxo-1-naphthaleneheptanoate, represented generically by formula (XX), on treatment with sodium hydroxide in aqueous dioxane yields dl-2,3,4,4aβ,4bα,5,6,7,8,8a-decahydro-8aβ-methyl-8β- benzyloxy-2-oxo-phenanthrene-1-propionic acid, represented generically by (XXI) as follows:

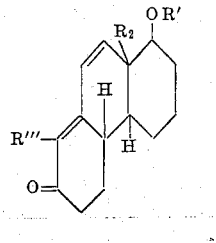

wherein $R_2$ is lower alkyl, R' is selected from the group consisting of t-butyl and benzyl and R''' is selected from the group consisting of hydrogen, lower alkyl, acetic acid and propionic acid. Where the above-mentioned hexenoate is used in the reaction, R''' for compounds represented by (XXI) is acetic acid.

The compounds (XXII) of the flowsheet may be illustrated by the formula:

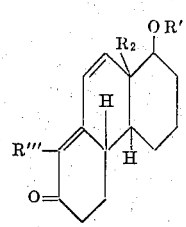

wherein $R_2$ is lower alkyl, R' is selected from the group consisting of t-butyl and benzyl and R''' is selected from the group consisting of hydrogen, lower alkyl, acetic acid and propionic acid.

The reduction of compounds (XXI to XXII) is carried out with hydrogen and a hydrogenation catalyst, preferably palladium on strontium carbonate. Two solvent systems are employed in the reduction. When XXI (R''' is -CH$_2$CH$_2$COOH or -CH$_2$COOH) is the substrate, water containing one equivalent of an alkali metal hydroxide, preferably sodium hydroxide, is used. When XXI (R''' is H or lower alkyl) is the substrate, an inert solvent, preferably benzene, is used. As a specific example, dl-8β-benzyloxy-2,3,4,4aβ,4bα,5,6,7,8,8a-decahydro-8aβ-methyl-2-oxo-phenanthrene-1-propionic acid (XXI, $R_2$ is CH$_3$, R' is CH$_2$C$_6$H$_5$, R''' is CH$_2$CH$_2$COOH) on reduction with hydrogen in water containing one equivalent of sodium hydroxide in the presence of palladium on strontium carbonate give dl-8β-benzyloxy-2,3,4,4aβ,4bα,5,6,7,8,8a,9,10-dodecahydro-8aβ-methyl-2-oxo-phenanthrene-1-propionic acid (XXII, $R_2$ is CH$_3$, R' is CH$_2$C$_6$H$_5$, R''' is CH$_2$CH$_2$COOH). Where the corresponding acetic acid analog of (XXI, R''' is CH$_2$COOH) is reduced with hydrogen in water, the corresponding acetic acid compound (XXII, R''' is CH$_2$COOH) is found.

Although the examples above are specific for $R_2$ as methyl, the processes are equally applicable when $R_2$ is lower alkyl and the invention includes the compounds in which $R_2$ is a lower alkyl radical.

In the flowsheet R', $R_2$, R'' and R''' are as hereinbefore defined and R is lower alkyl.

When the compounds (XXII wherein R''' is -CH$_2$CH$_2$COOH, or -CH$_2$COOH, $R_2$ is lower alkyl and R' is benzyl or t-butyl) are treated with acetic anhydride-sodium acetate, good yields of compounds (XXIII or XXIIIA) are produced. As a specific example, the treatment of dl-8β-benzyloxy-2,3,4,4aβ,4bα,5,6,7,8,8a, -9,10-dodecahydro-8aβ-methyl-2-oxo-phenanthrene-1-propionic acid (in which $R_2$ is CH$_3$) with acetic anhydride and sodium acetate gives in good yield dl-17a,β-benzyloxy-5-hydroxy-3,5-seco-4-nor-5(10), 9(11)-D-homoestradien-3-oic acid, 3,5-lactone (XXIII, in which $R_2$ is CH$_3$). Treatment of (XXII, where R''' is -CH$_2$COOH), yields dl-13 lower alkyl-17a-benzyloxy-1,4-bisnor-3,5-seco-5-hydroxy-D-homo-gona-5(10),9(11)-dien-3-oic acid, 3,5-lactone.

Reduction of compounds (XXIII) with hydrogen and a hydrogenation catalyst, preferably palladium on strontium carbonate in an inert solvent, such as benzene, gives, in excellent yield (compounds XXIV). As for example, dl-17a,β-benzyloxy-5-hydroxy-3,5-seco-4-nor-5(10),9(11)-D-homoestradien-3-oic acid, 3,5-lactone (XXIII, wherein $R_2$ is CH$_3$) on reduction gives dl-17a,β-benzyloxy-5-hydroxy-3,5-seco-4-nor-5(10)-D-homoestren-3-oic acid, 3,5-lactone (XXIV, wherein $R_2$ is CH$_3$).

Finally, when compounds (XXIV) are treated with a methyl magnesium halide, such as the bromide, and the crude product allowed to stand in a mixture of acetic and hydrochloric acids, compounds (XXV) are formed in good yield. For example, dl-17a,β-benzyloxy-5-hydroxy-3,5-seco-4-nor-5(10)-D-homoestren-3-oic acid, 3,5-lactone (XXIV, wherein $R_2$ is CH$_3$) gives on treatment with methyl magnesium bromide followed by acid a good yield of dl-19-nor-D-homotestosterone, benzylether (compound XXV, wherein $R_2$ is CH$_3$).

This compound (XXV) can be transformed into the known biologically active compound dl-19-nor-D-homotestosterone by removing the benyzl blocking group. This can be removed by reduction with lithium in liquid ammonia after protecting the keto group as the ethylene-dioxy ketal, and subsequent acid hydrolysis of the ketal.

When the starting material is dl-17aβ-benzyloxy-5-hydroxy-3,5-seco- 4-nor-5(10)-D-homogonene-3-oic acid, 3,5-lactone (compounds XXIV, wherein $R_2$ is C$_2$H$_5$), the final product will be dl-13-ethyl-19-nor-D-homo-4-gonene-17aβ-ol (compounds XXV, wherein $R_2$ is ethyl and R' is H).

When dl-17aβ-t-butoxy-5-hydroxy-3,5-seco-4-nor-5(10)-D-homoestren-3-oic acid, 3,5-lactone (compounds XXIV, wherein $R_2$ is CH$_3$ and R' is t-butyl) is treated with methyl magnesium bromide followed by acid, the product is directly dl-19-nor-D-homotestosterone, the t-butyl blocking group having been removed during the acid treatment.

Similarly, when the starting material is dl-17aβ-t-butoxy-13-ethyl-5-hydroxy-3,5-seco-4-nor-5(10)-D-homogonene-3-oic acid, 3,5-lactone (compounds XXIV, wherein $R_2$ is C$_2$H$_5$ and R' is t-butyl) and it is carried through the identical reaction sequence, the product is dl-13-ethyl-19-nor-D-homo-4-gonene-17aβ-ol (compounds XXV, wherein $R_2$ is ethyl and R' is H).

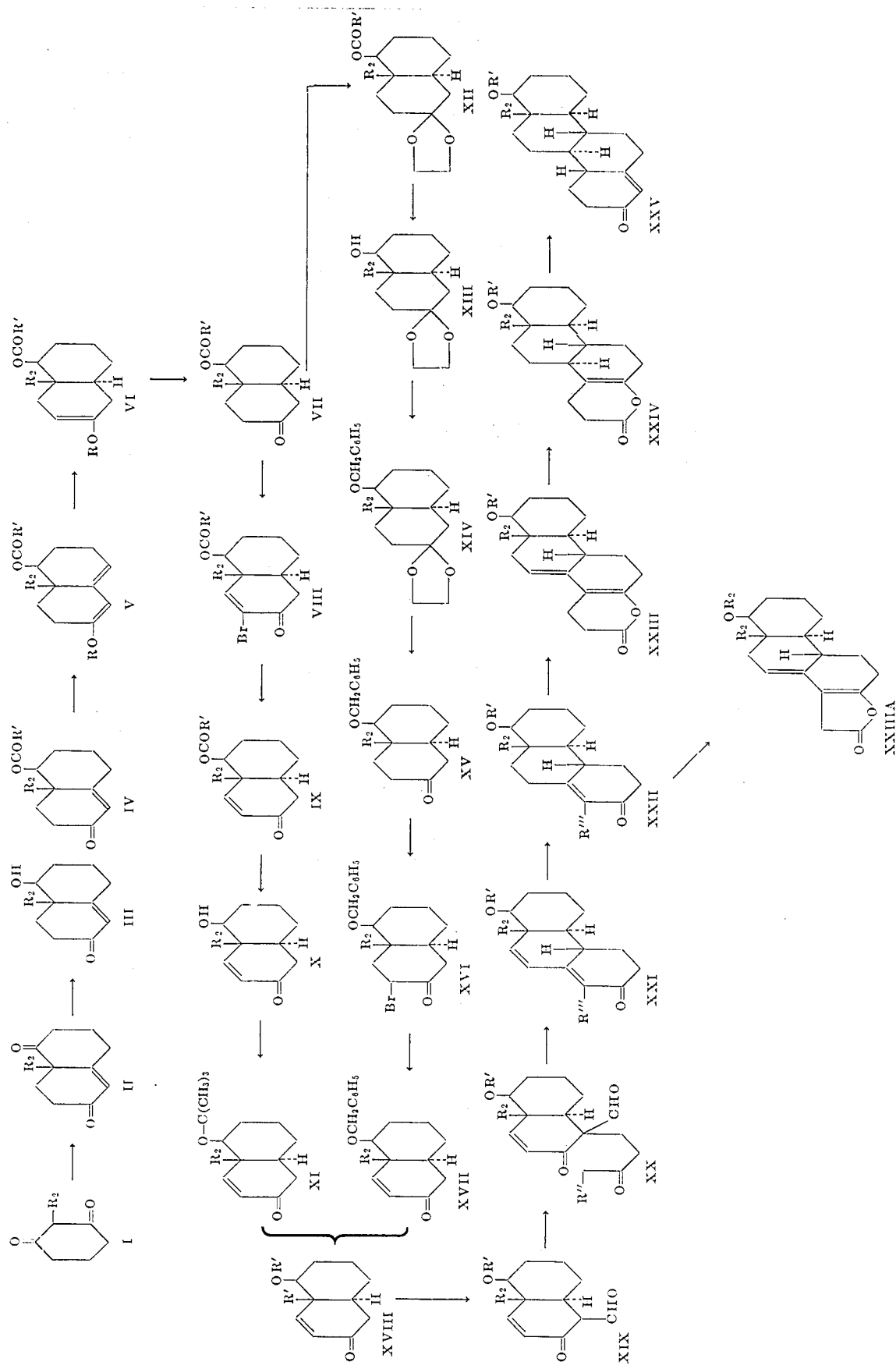

The following examples describe the use of starting materials, sch as 2-lower alkylcyclohexane-1,3-diones to prepare the present compounds and subsequently converting the present compounds to the biologically active dl-19-nor-D-homotestosterone.

EXAMPLE 1

Preparation of 1,6-dioxo-$\Delta^{5(10)}$-9-ethyloctalin (II)

A mixture of 70.0 g. 2-ethylcyclohexane-1,3-dione (I), 62 ml. of methylvinyl ketone, 0.25 g. potassium hydroxide and 250 ml. absolute methanol are heated with stirring under reflux for 4 hours. Methanol and excess methylvinyl ketone are then removed by distillation at atmospheric pressure. Benzene is added to the residue and the distillation continued until the temperature of the vapours is 80°C. indicating complete removal of methanol and water. Benzene is added to bring the volume of the solution up to the original volume. The solution is cooled in an ice bath and 3 ml. pyrrolidine is added. The solution is heated under reflux under a Dean-Stark water separator for 1 hour when no more water is azeo-tropically distilling. The solution is cooled in ice, diluted with ether and washed with 100 ml. water containing 15 ml. of a 10% hydrochloric acid solution, followed by 100 ml. water. The aqueous phases are combined and washed with 50 ml. ether. The combined organic phases are washed with three 100 ml. portions of water, saturated brine, dried and evaporated. The residue is distilled. The main fraction boils at 130°–135°C. at 0.06 mm. The distillate is crystallized from ether-hexane to yield 46.7 g. of 1,6-dioxo-$\Delta^{5(10)}$-9-ethyloctalin. The analytical sample obtained by recrystallizations from ether-hexane has melting point 67.5°–68.5°C.

The 1,6-dioxo-$\Delta^{5(10)}$-9-lower alkyloctalins are prepared by substituting the appropriate 2-lower alkylcyclohexane-1,3-dione for the 2-ethylcyclohexane-1,3-dione in the above reaction. For example, the 1,6-dioxo-$\Delta^{5(10)}$-9-methyloctalin and 1,6-dioxo-$\Delta^{5(10)}$-9-propyloctalin are readily prepared by this procedure.

EXAMPLE 2

Preparation of 1-hydroxy-6-oxo-$\Delta^{5(10)}$-9-ethyloctalin (III)

To an ice-cold stirred solution of 9.6 g. of 1,6-dioxo-$\Delta^{5(10)}$-9-ethyloctalin in 90 ml. absolute ethanol is added 200 mg. purified sodium borohydride. After 15 minutes, 200 mg. sodium borohydride is added and after a further 15 minutes, 160 mg. sodium borohydride. The stirring and cooling are continued for 15 minutes and then the solution is acidified with glacial acetic acid. The ethanol is removed under reduced pressure and the residue partitioned between chloroform and water. The aqueous phase is washed with chloroform and the combined organic phases washed with sodium bicarbonate solution, dried and evaporated. The residue is distilled, the product, 1-hydroxy-6-oxo-$\Delta^{5(10)}$-9-ethyloctalin, boils at 165°C. at 0.8 mm. The oil crystallizes and the analytical sample, melting point 88.0°–89.5°C. is obtained by recrystallization from acetone-hexane.

By employing the appropriate 1,6-dioxo-$\Delta^{5(10)}$-9-lower alkyloctalin in the above reaction, the corresponding 1-hydroxy-6-oxo-$\Delta^{5(10)}$-9-lower alkyloctalin is produced. For example, the corresponding -9-methyloctalin, -9-propyloctalin, -9-butyl or isopropyloctalins may be prepared by this procedure.

EXAMPLE 3

Preparation of 1-acetoxy-6-oxo-$\Delta^{5(10)}$-9-ethyloctalin (IV)

A mixture of 3.98 g. of 1-hydroxy-6-oxo-$\Delta^{5(10)}$-9-ethyloctalin, 10 ml. acetic anhydride and 2 ml. pyridine are heated on a steam bath for 1.5 hours. The solution is then poured into 300 ml. ice water wih stirring. After stirring for 1 hour, the aqueous mixture is extracted with ether and the ether washed with water, saturated sodium bicarbonate solution, dried and evaporated. The 1-acetoxy-6-oxo-$\Delta^{5(10)}$-9-ethyloctalin is obtained as a colorless oil, weighing 4.2 g. and is used without further purification.

The above reaction, when condensed with the appropriate 1-hydroxy-6-oxo-$\Delta^{5(10)}$-9-lower alkyloctalin in presence of pyridine and the appropriate acyl anhydride or aroyl halide yields the corresponding 1-acyloxy-6-oxo-$\Delta^{5(10)}$-9-lower alkyloctalin or 1-aroyloxy-6-oxo-$\Delta^{5(10)}$-9-lower alkyloctalin, for example, 1-propionyloxy-6-oxo-$\Delta^{5(10)}$-9-propyloctalin or 1-benzyloxy-6-oxo-$\Delta^{5(10)}$-9-methyloctalin respectively.

EXAMPLE 4

Preparation of 1-acetoxy-6-ethoxy-9-methyl-$\Delta^{4(10),5}$-hexahydro-naphthalene (V)

To a solution of 44.4 grams (0.2 mole) of 1-acetoxy-6-oxo-9-methyl-$\Delta^{5(10)}$-octalin in 44 ml. ethyl orthoformate, 4 ml. absolute ethanol and 200 ml. benzene is added 4 ml. of absolute ethanol saturated with hydrogen chloride and the mixture is heated under refluxing conditions for 2 hours. The mixture is cooled, diluted with an equal volume of ether and poured into 300 ml. of 5% sodium hydroxide solution. After shaking thoroughly, the aqueous phase is discarded. The organic phase is washed with water, saturated brine, dried and the solvent evaporated. The residue, a yellow mobile oil, which can be crystallized to a colorless hydroscopic solid is essentically pure 1-acetoxy-6-ethoxy-9-methyl-$\Delta^{4(10),5}$-hexahydronaphthalene as determined spectroscopically. This material is used directly for the preparation of 1-acetoxy-6-ethoxy-9-methyl-trans-$\Delta^6$-octalin (VI).

EXAMPLE 5

Preparation of 1-acetoxy-6-ethoxy-9-ethyl-$\Delta^{4(10),5}$-hexahydro-naphthalene (V)

The crude 1-acetoxy-6-oxo-$\Delta^{5(10)}$-9-ethyloctalin (4.2 g.) (Example 3), 5.6 ml. ethyl orthoformate, 1 ml. absolute ethanol, 1 ml. absolute ethanol saturated with hydrogen chloride and 100 ml. benzene are heated under reflux for 2 hours. The solution is cooled, diluted with ether, and washed with 100 ml. of 5% sodium hydroxide followed by washings with water and saturated brine. The organic phase is dried and evaporated to yield 1-acetoxy-6-ethoxy-9-ethyl-$\Delta^{4(10),5}$-hexahydronaphthalene as a pale yellow oil weighing 4.7 g. This is used without further purification for the preparation of 1-acetoxy-6-ethoxy-$\Delta^6$-9-ethyl-trans-octalin.

In the above Examples 4 and 5, ethyl orthoformate is used, other orthoformates may also be used such as methyl, propyl, butyl and the like. Also other strong acid catalysts can be used in place of hydrogen chloride such as sulfuric acid.

When 1-benzoyloxy, 1-toluoyloxy or 1-halobenzoyloxy, -6-oxo-9-lower alkyl-$\Delta^{5(10)}$-octalin, prepared as for example, by reacting 1-hydroxy-6-oxo- 9-lower alkyl-Δ⁵⁽¹⁰⁾-octalin with benzoyl chloride or the like in pyridine, is substituted for 1-acetoxy-6-oxo-9-lower alkyl-Δ⁵⁽¹⁰⁾-octalin, the product from the reaction is the corresponding 1-benzoyloxy, 1-toluoyloxy or 1-halobenzoyloxy, -6-ethoxy-9-lower alkyl-Δ⁴⁽¹⁰⁾,⁵-hexahydro-naphthalene. When this starting material is employed, the products V through IX, illustrated on the flowsheet, have the 1-acetoxy group replaced by the 1-benzoyloxy, 1-toluoyloxy or 1-halobenzoyloxy group.

EXAMPLE 6

Preparation of 1-acetoxy-6-ethoxy-9-methyl-trans-Δ⁶-octalin (VI)

The crude enol ether of Example 4 (from 6.7 grams 1-acetoxy-6-oxo-9-methyl-Δ⁵⁽¹⁰⁾-octalin) is dissolved in 150 ml. absolute ethanol and hydrogenated at room temperature and atmospheric presure in the presence of 400 mg. of 2% palladium-on-strontium carbonate. One mole of hydrogen is absorbed in 2 hours. The catalyst is removed by filtration and the ethanol evaporated under reduced pressure. The crude residue of 1-acetoxy-6-ethoxy-9-methyl-trans-Δ⁶-octalin is used directly for the preparation of 1-acetoxy-9-methyl-6-oxo-trans-decalin of Example 8.

In the above reaction, other hydrogenation catalysts may be used such as for example palladium on carbon, etc.

EXAMPLE 7

Preparation of 1-acetoxy-6-ethoxy-Δ⁶-9-ethyl-trans-octalin (VI)

The crude enol ether of Example 5 (4.7 g.) from 1-acetoxy-6-oxo-Δ⁵⁽¹⁰⁾-9-ethyloctalin is dissolved in 200 ml. absolute ethanol and 1.0 g. of 2% palladium hydroxide on strontium carbonate is added. The catalyst and compound are reduced with hydrogen at atmospheric pressure. One molar equivalent of hydrogen is absorbed. The catalyst is then removed by filtration and the solvent evaporated under reduced pressure. The residue consisting predominantly of 1-acetoxy-6-ethoxy-Δ⁶-9-ethyl-trans-octalin weighs 4.7 g. and is used without further purification.

Further, employing the procedure set forth in Examples 6 and 7 above and substituting an enol ether of the general formula:

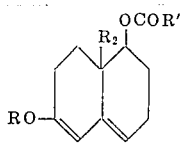

where R and R₂ are lower alkyl, for the 1-acetoxy-6-ethoxy-9-methyl-Δ⁴⁽¹⁰⁾,⁵-hexahydronaphthalene of Example 6 or the 1-acetoxy-6-ethoxy-9-ethyl-Δ⁴⁽¹⁰⁾,⁵-hexahydronaphthalene of Example 7, and R' is a radical selected from the group consisting of hydrogen, lower alkyl, phenyl and substituted phenyl radicals, there is produced a compound of the general formula:

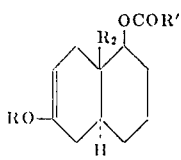

wherein R and R₂ are lower alkyl and R' is a radical as described above.

EXAMPLE 8

Preparation of 1-acetoxy-9-methyl-6-oxo-trans-decalin (VII)

The crude 1-acetoxy-6-ethoxy-9-methyl-trans-Δ⁶-octalin is warmed on the steam bath for 0.5 hour with 60 ml. 50% aqueous acetic acid. After cooling, the solution is diluted with water and extracted with ether. The ether is washed twice with water followed by saturated sodium bicarbonate solution. The organic phase is dried and the solvent evaporated. The residue is crystallized from a small volume of hexane to give 4.1 grams (61%) of 1-acetoxy-9-methyl-6-oxo-trans-decalin, melting point 46°–49°C.

EXAMPLE 9

Preparation of 1-acetoxy-6-oxo-9-ethyl-trans-decalin (VII)

The crude 1-acetoxy-6-ethoxy-Δ⁶-9-ethyl-trans-octalin (4.7 g.) prepared as in Example 7 is heated on a steam bath with 20 ml. water and 20 ml. glacial acetic acid for 0.5 hour. The solution is cooled, diluted with water and extracted with ether. The ether is washed with water, saturated sodium bicarbonate solution, dried and evaporated. The residue of 1-acetoxy-6-oxo-9-ethyl-trans-decalin weighs 4.1 g. and is used without further purification.

Using the procedure described in Examples 8 or 9 above and reacting a compound of the formula:

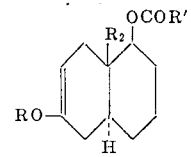

where R and R₂ are lower alkyl and R' is a radical selected from the group consisting of hydrogen, lower alkyl, phenyl and substituted phenyl radicals, with aqueous acetic acid will yield a compound of the formula:

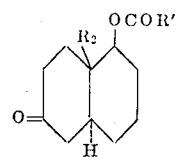

where R₂ and R' are as described above.

EXAMPLE 10

Preparation of 1-acetoxy-7-bromo-6-oxo-9-methyl-trans-decalin (VIII)

A mixture of 1-acetoxy-6,6-ethylenedioxy-9-methyl-trans-decalin (25 g.) and 100 ml. 50% acetic acid are heated on the steam bath for 0.5 hour. After cooling, the solution is diluted with water and extracted with ether. The ether is washed with water, saturated sodium bicarbonate, dried and evaporated. The residue of 1-acetoxy-6-oxo-9-methyl-trans-decalin weighs 20.5 g. The keto acetate is dissolved in 150 ml. chloroform and cooled to 0°C. To the stirred solution is added dropwise a solution of 15.0 g. of bromine in 75 ml. chloroform. After the addition, the chloroform is removed under reduced pressure and the residue crystallizes from ether to give 20.85 g. (74% overall) of the bromo ketone. The analytical sample obtained by recrystallizations of the crude product from acetone-hexane has a melting point 147°–148°C.

The compound 1-acetoxy-7-bromo-6-oxo-9-ethyl-trans-decalin is readily prepared in good yield by the above procedure employing 1-acetoxy-6,6-ethylenedioxy-9-ethyl-trans-decalin in place of the 1-acetoxy-6,6-ethylenedioxy-9-methyl-trans-decalin.

EXAMPLE 11

Preparation of 1-acetoxy-6-oxo-9-methyl-$\Delta^7$-trans-octalin (IX)

A mixture of 27.6 g. of 1-acetoxy-7-bromo-6-oxo-9-methyl-trans-decalin, 25 g. of dry lithium chloride and 25 g. dry lithium carbonate in 400 ml. dry dimethyl-formamide are heated at reflux under nitrogen for 2 hours. The solution is cooled, diluted with water and extracted with ether. The ether is washed twice with water, saturated brine, dried and evaporated. The residue crystallizes completely and weighed 18.0 g. (89%). This material is sufficiently pure for the next reaction. An analytical sample obtained by recrystallization from ether-hexane has a melting point 62.5°–63.5°C.

This process is also advantageously employed to produce 1-acetoxy-6-oxo-9-ethyl-$\Delta^7$-trans-octalin in high yield by simply substituting 1-acetoxy-7-bromo-6-oxo-9-ethyl-trans-decalin for 1-acetoxy-7-bromo-6-oxo-9-methyl-trans-decalin in the reaction.

EXAMPLE 12

Preparation of 1-hydroxy-6-oxo-9-methyl-$\Delta^7$-trans-octalin (X)

A mixture of 17.4 g. of 1-acetoxy-6-oxo-9-methyl-$\Delta^7$-trans-octalin in 100 ml. ethanol and 50 g. potassium bicarbonate in 150 ml. water are heated under reflux for 5.5 hours. The mixture is cooled, diluted with water and extracted with ether. The ether is washed with water and saturated brine, dried and evaporated. The residue is crystallized from ether-hexane to give 10.2 g. of 1-hydroxy-6-oxo-9-methyl-$\Delta^7$-trans-octalin, melting point 86°–88°C. The analytical sample has melting point 88–89°C.

Substituting 1-acetoxy-6-oxo-9-ethyl-$\Delta^7$-trans-octalin for 1-acetoxy-6-oxo-9-methyl-$\Delta^7$-trans-octalin gives the corresponding 9-ethyl derivative (X) in good yield.

EXAMPLE 13

Preparation of 1-t-butoxy-6-oxo-9-methyl-$\Delta^7$-trans-octalin (XI)

To 25 ml. of liquid isobutylene containing 0.5 ml. of 100% phosphoric acid saturated with boron trifluoride is added 5.0 g. of 1-hydroxy-6-oxo-9-methyl-$\Delta^7$-trans-octalin in 25 ml. dry methylene chloride. The mixture is shaken overnight at room temperature. After cooling the mixture in an ice-methanol bath, excess isobutylene is removed by a stream of dry nitrogen and the residue is dissolved in methylene chloride. The solution is washed thoroughly with saturated sodium bicarbonate solution, dried and evaporated. The residue is dissolved in hexane and passed through a plug of neutral alumina. Evaporation of the solvent yielded 5.7 g. (87%) of crystalline t-butyl ether melting point 72°–73°C.

The compound 1-t-butoxy-6-oxo-9-ethyl-$\Delta^7$-trans-octalin is prepared in accordance with the above procedure employing as the starting material 1-hydroxy-6-oxo-9-ethyl-$\Delta^7$-trans-octalin in the place of 1-hydroxy-6-oxo-9-methyl-$\Delta^7$-trans-octalin.

EXAMPLE 14

Preparation of 1-acetoxy-6,6-ethylenedioxy-9-methyl-trans-decalin (XII)

The crude 1-acetoxy-9-methyl-6-oxo-trans-decalin derived from 16 grams crude 1-acetoxy-6-ethoxy-9-methyl-$\Delta^{4(10),5}$-hexahydronaphthalene by the series of reactions described in Examples 4, 6 and 8 without purification of any intermediates is heated in 250 ml. benzene containing 16 grams ethylene glycol and 200 mg. p-toluenesulphonic acid under a Dean-Stark water separator for 4 hours. The cold benzene solution is diluted with 200 ml. ether and then washed successively with saturated sodium bicarbonate solution, water and saturated brine. After drying the organic phase, the solvents are removed under reduced pressure. The residue is diluted with an equal volume of hexane and kept at 0°C. overnight. The crystalline mass is removed by filtration and washed with 20 ml. cold hexane. Total yield of 1-acetoxy-6,6-ethylenedioxy-9-methyl-trans-decalin is 9.7 grams (57% based on enol ether of Example 4), melting point 116°–117°C. is obtained.

In the above reaction ethylene glycol is used to protect the keto group, however, other alcohols can be used such as propandiol.

EXAMPLE 15

Preparation of 1-acetoxy-6,6-ethylenedioxy-9-ethyl-trans-decalin (XII)

A solution of crude 1-acetoxy-6-oxo-9-ethyl-trans-decalin (2.05 g.) prepared as in Example 9 dissolved in 100 ml. benzene containing 2.05 g. ethylene glycol and 100 mg. p-toluenesulphonic acid is heated under reflux under a Dean-Stark water separator until no more water is azeotropically removed (4.5 hours). The solution is cooled, diluted with ether and washed with saturated sodium bicarbonate solution. The organic phase is then washed with water followed by saturated brine, dried and the solvents removed under reduced pressure. The residue is crystallized from hexane to give 1-acetoxy-6,6-ethylenedioxy-9-ethyl-trans-decalin. The analytical sample obtained by recrystallizations of the product from acetone-hexane has a melting point 78.5°–79.5°C.

A compound of the formula:

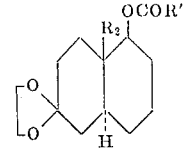

as exemplified by Examples 14 and 15 above, where $R_2$ is lower alkyl and $R'$ is hydrogen, lower alkyl, phenyl or substituted phenyl radical are prepared by reacting a compound of the formula:

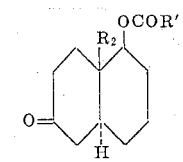

where $R_2$ and $R'$ are as described above, with benzene, ethylene glycol and an acid such as p-toluenesulphonic acid.

EXAMPLE 16

Preparation of 1-hydroxy-6,6-ethylenedioxy-9-methyl-trans-decalin (XIII)

A mixture of 10.72 grams 0.04 mole) of 1-acetoxy-6,6-ethylenedioxy-(-methyl-trans-decalin, 100 ml. ethanol and 50 ml. 2N potassium hydroxide solution are heated under refluxing conditions for 2 hours. Most of the ethanol is removed by distillation under reduced pressure, the residue is diluted with water and extracted with ether. The ether is washed with water, saturated brine, dried and evaporated. The residue crystallizes completely to give 7.9 grams (84% yield) of 1-hydroxy-6,6-ethylenedioxy-9-methyl-trans-decalin, melting point 71°–72°C.

Employing the procedure of this example and substituting a 1-acyloxy- or 1-aroyloxy-, -6,6-ethylenedioxy-9-lower alkyl-trans-decalin for 1-acetoxy-6,6-ethylenedioxy-9-methyl-trans-decalin will yield the corresponding 1-hydroxy-6,6-ethylenedioxy-9-lower alkyl-trans-decalin. The 1-hydroxy-6,6-ethylenedioxy-9-ethyl-trans-decalin prepared by this method is a crystalline solid, melting point 95–96°C.

EXAMPLE 17

Preparation of 1-benzyloxy-6,6-ethylenedioxy-9-methyl-trans-decalin (XIV, $R_2=CH_3$)

A mixture of 63 ml. benzyl chloride, 10.85 g. 1-hydroxy-6,6-ethylenedioxy-9-methyl-trans-decalin (XIII, $R_2$ is $CH_3$) and 11.05 g. of a 54% suspension of sodium hydride in mineral oil is stirred and gradually heated. At 120°–125°C. a vigorous exothermic reaction takes place. When the reaction has subsided, a temperature of 130°C. is maintained for 1 hour. The mixture is diluted with benzene and filtered. The benzene and excess benzyl chloride are removed under reduced pressure and the residue distilled. The product, 1-benzyloxy-6,6-ethylene-dioxy-9-methyl-trans-decalin is distilled at 176°–182°C. at 0.5 mm., (13.0 g.). The product (XIV, $R_2$ is $CH_3$) crystallizes completely and the analytical sample (from hexane) has a melting point 83°–83.5°C.

When 1-hydroxy-6,6-ethylenedioxy-9-ethyl-trans-decalin (XIII, $R_2$ is $C_2H_5$) is used in the reaction with benzyl chloride, the product is 1-benzoyloxy-6,6-ethylenedioxy-9-ethyl-trans-decalin (XIV, $R_2$ is $C_2H_5$), which distills at 182°–184°C. at 0.05 mm.

EXAMPLE 18

Preparation of 1-benzyloxy-6-oxo-9-methyl-trans-decalin (XV, $R_2=CH_3$)

To a solution of 130 g. of 1-benzyloxy-6,6-ethylenedioxy-9-methyl-trans-decalin (XIV, $R_2$ is $CH_3$) in 500. ml. glacial acetic acid is added 300 ml. water and the mixture heated on the steam bath for 0.5 hour. Approximately 200 ml. glacial acetic acid are added and the heating continued for 1.5 hours. After cooling the mixture, it is diluted with water and extracted with ether. The ether is washed with water, saturated sodium bicarbonate solution, dried and evaporated. The residue is distilled and the product has boiling point 157°C. at 0.03 mm. The product can be crystallized from hexane at −10°C. to a solid melting point 46°–47°C.

When 1-benzyloxy-6,6-ethylenedioxy-9-ethyl-trans-decalin (XIV, $R_2$ is $C_2H_5$) is hydrolyzed in the same way as described above, the product is 1-benzyloxy-6-oxo-9-ethyl-trans-decalin (XV, $R_2$ is $C_2H_5$).

EXAMPLE 19

Preparation of 1-benzyloxy-7-bromo-6-oxo-9-methyl-trans-decalin (XVI, $R_2=CH_3$)

A stirred solution of 38.35 g. of 1-benzyloxy-6-oxo-9-methyl-trans-decalin in 500 ml. chloroform was cooled to 0°C. and then 25.9 g. of bromine in 175 ml. chloroform is added dropwise at such a rate that there is never more than a small amount of free bromine present. After the addition, the solution is poured into a saturated aqueous sodium bicarbonate solution. The two phases are well shaken, the chloroform layer separates, is dried and evaporated. The residue (51.0 g.) consisting mainly of 1-benzyloxy-7-bromo-6-oxo-9-methyl-trans-decalin (XVI, $R_2$ is $CH_3$) is used without further purification. The compound can be crystallized from acetone-hexane and the analytical sample melted at 112°–113°C.

When 1-benzyloxy-6-oxo-9-ethyl-trans-decalin, (XV, $R_2=C_2H_5$) is brominated in the same way, the product is 1-benzyloxy-7-bromo-6-oxo-9-ethyl-trans-decalin (XVI, $R_2$ is $C_2H_5$), which has melting point 139°–140'C.

EXAMPLE 20 140°

Preparation of 1-benzyloxy-6-oxo-9-methyl-$\Delta^7$-trans-octalin (XVII $R_2=CH_3$)

The crude 1-benzyloxy-7-bromo-6-oxo-9-methyl-trans-decalin (51.0 g.) prepared as in Example 19 is dissolved in 600 ml. dry dimethylformamide and 35 g. of dry lithium carbonate and 35 g. of dry lithium carbonate added. The mixture is stirred and heated at reflux under nitrogen for two hours. The mixture is cooled and most of the solids removed by filtration. The filtrate is diluted with water and extracted with ether, then ether washed with water, saturated brine, dried and evaporated. The residue is distilled to give 1-benzyloxy-6-oxo-9-methyl-$\Delta^7$-trans-octalin (XVII, $R_2$ is $CH_3$) as a pale yellow oil, boiling point 170°C. at 0.5 mm.

When 1-benzyloxy-6-oxo-7-bromo-9-ethyl-trans-decalin (XVI, $R_2$ is $C_2H_5$) is dehydrobrominated as described above, the product is 1-benzyloxy-6-oxo-9-ethyl-$\Delta^7$ trans-octalin (XVII, $R_2$ is $C_2H_5$), which distills at 165°–170°C. at 0.1 mm.

EXAMPLE 21

Preparation of trans-1,2,4a,5,6,7,8,8a-octahydro-4a-methyl5-t-butoxy-2-oxo-1-naphthaldehyde (XIX, $R_2=CH_3$, $R'=$t-butyl)

To a stirred suspension of dry sodium methoxide (from 0.74 g. sodium) in dry benzene under nitrogen i added 4.5 ml. of redistilled ethyl formate in a gentle stream. After stirring at room temperature for 0.5 hour, the mixture is cooled to 0°C. and 2.36 g. of 1-t-butoxy-6-oxo-9-methyl-$\Delta^7$ -trans-octalin in 20 ml. dry benzene is added dropwise. The solution is then stirred overnight at room temperature. Water and ether are added to the mixture. The water is separated and the organic phase extracted twice with 1N potassium hydroxide. The combined aqueous phases are acidified with 2.5M sodium dihydrogen phosphate solution and thoroughly extracted with ether. The ether is washed with water, saturated brine, dried and evaporated. The residue (2.55 g.) consisting of trans-1,2,4a,5,6,7,8,8a-octahydro-4a-methyl-5-t-butoxy-2-oxo-1- naphthaldehyde (XIX, $R_2$ is $CH_3$, R' is $C(CH_3)_3$) is used without further purification.

EXAMPLE 22

Preparation of trans-1,2,4a5,6,7,8,8a-octahydro-4a-methyl-5-benzyloxy-2-oxo-1-naphthaldehyde (XIX, $R_2=CH_3$, $R'=CH_2C_6H_5$)

The above is prepared from 2.86 g. of crude 1-benzyloxy-6-oxo-9-methyl-$\Delta^7$-octalin (XV, $R_2$ is $CH_3$, R' is $CH_2C_6H_5$), ethylformate (4.5 ml.), and sodium methoxide (from 0.74 g. sodium) in a manner similar to that described for the t-butoxy analog in Example 21. The trans-1,2,4a,5,6,7,8,8a-octahydro-4a-methyl-5-benzyloxy-2-oxo-1-naphthaldehyde (XIX, $R_2$ is $CH_3$, R' is $CH_2C_6H_5$) (3.1 g.) is obtained as a pale yellow oil and used directly.

When the reactions described in Examples 21 and 22 use as starting materials the ethyl analog ($R_2$ is $C_2H_5$), the products are the corresponding ethyl compounds.

EXAMPLE 23

Preparation of trans-1,2,4a,5,6,7,8,8a-octahydro-4a-methyl-5-t-butoxy-2-oxo-1-(3-oxobutyl)-1-naphthaldehyde (XX, $R_2=CH_3$, $R'=C(CH_3)_3$, $R''=H$)

The crude 1-t-butoxy-5-formyl-6-oxo-9-methyl-$\Delta^7$-trans-octalin (2.55 g.) is dissolved in 100 ml. dry benzene and the solvent removed to remove traces of water. This procedure is repeated. The residue is dissolved in 20 ml. dry t-butanol and 0.87 g. freshly distilled methylvinyl ketone added. The air is displaced by nitrogen, the solution cooled down in an ice bath and 1 ml. of a 1M solution of potassium t-butoxide in t-butanol is added. The solution is left at room temperature overnight. Ether and water are added and the aqueous phase thoroughly extracted with ether. The ether is washed with water, saturated brine, dried and evaporated. The residue, a viscous pale yellow oil, of trans-1,2,4a,5,6,7,8,8a-octahydro-4a-methyl-5-t-butoxy-2-oxo-1-(3-oxobutyl)-1-naphthaldehyde (XX, $R_2$ is $CH_3$, R' is $C(CH_3)_3$, R'' is H) is used without further purification.

EXAMPLE 24

Preparation of trans-1,2,4a,5,6,7,8,8a-octahydro-4a-methyl-5-benzyloxy-2-oxo-1-(3-oxobutyl)-1-naphthaldehyde (XX, $R_2=CH_3$, $R'=CH_2C_6H_5$, $R''=H$)

From trans-1,2,4a,5,6,7,8,8a-octahydro-4a-methyl-5-benzyloxy-2-oxo-1-naphthaldehyde (XIX, $R_2$ is $CH_3$, R' is $CH_2$-$C_6H_5$), 3.1 g. crude as described in Example 22, 0.87 g. freshly distilled methylvinyl ketone and 1 ml. of a 1M solution of potassium t-butoxide in t-butanol there is obtained by following the procedure as described in Example 23, trans-1,2,4a,5,6,7,8,-8a-octahydro-4a-methyl-5-benzyloxy-2-oxo-1-(3-oxobutyl)-1-naphthaldehyde, is obtained as a viscous pale yellow oil which is used without further purification.

When the procedures described in Examples 23 and 24 are carried through with the ethyl analog, the products obtained are the 4a-ethyl naphthaldehydes.

EXAMPLE 25

Preparation of trans-1,2,4a,5,6,7,8,8a-octahydro-4a-methyl-5-benzyloxy-2-oxo-1-(3-oxopentyl)-1-naphthaldehyde (XX, $R=CH_3$), $R'=CH_2C_6H_5$, $R''=CH-_3$)

The above compound is prepared from trans-1,2,4a,5,6,7,8,8a-octahydro-4a-methyl-5-benzyloxy-2-oxo-1-naphthaldehyde (XIX, $R_2$ is $CH_3$, R' is $CH_2C_6H_5$) and ethylvinyl ketone by the procedure described in Example 24.

EXAMPLE 26

Preparation of methyl trans-1-formyl-1,2,4a,5,6,7,8,8a-octahydro-4a-methyl-5-t-butoxy-$\delta$,2-dioxo-1-naphthaleneheptanoate (XX, $R=CH_3$, $R'=C(CH_3)_3$, $R''=CH_2CH_2COOCH_3$)

The crude trans-1,2,4a,5,6,7,8,8a-octahydro-4a-methyl-5-t-butoxy-2-oxo-1-naphthaldehyde prepared in Example 21 is dissolved in 5 ml. dry t-butanol and 1.87 g. methyl 5-oxo-6-heptenoate added. After cooling the solution under a nitrogen atmosphere, 1 ml. of a 1 molar solution of potassium t-butoxide in t-butanol is added and the mixture kept at room temperature overnight. The solution is diluted with water and ether and the aqueous phase thoroughly extracted with ether. The ether is washed with water, and saturated brine, dried and evaporated. The residue of methyl trans-1-formyl-1,2,4a,5,6,7,8,8a-octahydro-4a-methyl-5-t-butoxy-$\delta$,2-dioxo-1-naphthaleneheptanoate (XX, $R_2$ is $CH_3$, R' is $C(CH_3)_3$, R'' is $CH_2CH_2$ $COOCH_3$) is obtained as a viscous, pale yellow oil, and is used without further purification. The methyl acetate analog, i.e., where R'' is $CH_2COOCH_3$ can also be prepared by this procedure using methyl 4-oxo-5-hexenoate instead of 5-oxo-6-heptenoate.

EXAMPLE 27

Preparation of methyl trans-1-formyl-1,2,4a,5,6,7,8,8a-octahydro-4a-methyl-5-benzyloxy-$\delta$,2-dioxo-1-naphthaleneheptanoate (XX, $R_2=CH_3$, $R'=CH_2C_6H_5$, $R''=CH_2CH_2COOCH_3$)

This is prepared from the crude trans-1,2,4a,5,6,7,8,8a-octahydro-4a-methyl-5-benzyloxy-2-oxo-1-naphthaldehyde, 3.1 g., described in Example 22, 1.87 g. of methyl 5-oxo-6-heptenoate and 1 ml. of a 1M solution of potassium t-butoxide in t-butanol by the procedure described in Example 26.

The product, methyl trans-1-formyl-1,2,4a,5,6,7,8,8a-octahydro-4a-methyl-5-benzyloxy-$\delta$,2-dioxo-1-naphthaleneheptanoate (XX, $R_2$ is $CH_3$, R' is $CH_2C_6H_5$, R'' is $CH_2CH_2COOCH_3$) is obtained as a pale yellow viscous oil and was used in this form without further purification. The methyl acetate analog of the above compound, i.e., where R'' is $CH_2COOCH_3$, can be prepared by this procedure with methyl 4-oxo-5-hexenoate in place of methyl 5-oxo-6-heptenoate.

EXAMPLE 28

Preparation of dl-8$\beta$-t-butoxy-8a$\beta$-methyl-4,4a$\beta$,4b$\alpha$,5,6,7,8,8a-octahydro-2(3H)-phenanthrone (XXI, $R_2=CH_3$, $R'=C(CH_3)_3$, $R'''=H$)

The crude trans-1,2,4a,5,6,7,8,8a-octahydro-4a-methyl-5-t-butoxy-2-oxo-1-(3-oxobutyl)-1-naphthaldehyde prepared in Example 23 is dissolved in 25 ml. dioxane and cooled to 0°C. A solution of 1.7 g. potassium hydroxide in 25 ml. water is added and the air displaced by nitrogen. After standing at room temperature for 3 hours, ether and water are added to the mixture and the aqueous phase thoroughly extracted with ether. The ether is washed with water and saturated brine, dried and evaporated. The residue is crystallized from ether-hexane. The analytical sample crystallized from hexane has the melting point 134°-135°C.

EXAMPLE 29

Preparation of dl-8β-benzyloxy-8aβ-methyl-4,4aβ,4bα,5,6,7,8,8a-octahydro-2(3H)-phenanthrone (XXI, $R_2$=$CH_3$, $R'$=$CH_2C_6H_5$, $R'''$=H)

The above is prepared from trans-1,2,4a,5,6,7,8,8a-octahydro-4a-methyl-5-benzyloxy-2-oxo-1-(3-oxobutyl)-1-naphthaldehyde (prepared as in Example 24) in 25 ml. dioxane and 1.7 g. potassium hydroxide in 25 ml. water as described in Example 28. The crude product is chromatographed on alumina to yield dl-8β-benzyloxy-8aβ-methyl-4,4aβ,4bα,5,6,7,8,8a-octahydro-2(3H)-phenanthrone. An analytical sample, recrystallized from methanol, has melting point 109°-110°C.

EXAMPLE 30

Preparation of dl-8β-benzyloxy-8aβ,1-dimethyl-4,4aβ,4bα,5,6,7,8,8a-octahydro-2(3H)-phenanthrone (XXI, $R_2$=$CH_3$, $R'$=$CH_2C_6H_5$, $R'''$=$CH_3$)

This is prepared from trans-1,2,4a,5,6,7,8,8a-octahydro-4a-methyl-5-benzyloxy-2-oxo-1-(3-oxopentyl)-1-naphthaldehyde (XX, $R_2$ is $CH_3$, $R'$ is $CH_2C_6H_5$) by the procedure described in Example 28 to give the product dl-8β-benzyloxy-8aβ,1-dimethyl-4,4aβ,4bα,5,6,7,8,8a-octahydro-2(3H)-phenanthrone (XXI, wherein $R_2$ is $CH_3$, $R'$ is $CH_2C_6H_5$ and $R'''$ is $CH_3$).

EXAMPLE 31

Preparation of dl-2,3,4,4aβ,4bα,5,6,7,8,8a-decahydro-8aβ-methyl-8β-t-butoxy-2-oxo-phenanthrene-1-propionic acid (XXI, $R_2$=$CH_3$), $R'$=$C(CH_3)_3$, $R'''$=$CH_2CH_2COOH$)

Crude methyl trans-1-formyl-1,2,4a,5,6,7,8,8a-octahydro-4a-methyl-5-t-butoxy-δ,2-dioxo-1-naphthaleneheptanoate (3.0 g.) prepared in Example 26 is dissolved in 15 ml. dioxane and 30 ml. of a 1.6M solution of sodium hydroxide added. The mixture is stirred overnight at room temperature under nitrogen. The solution is diluted with water and extracted with ether. The aqueous phase is acidified with 6N sulphuric acid and rapidly extracted with ether. The ether is washed twice with water followed by saturated brine solution. The ether is dried and evaporated. The residue (2.0 g.) is exhaustively extracted with boiling cyclohexane. The cyclohexane is evaporated and the residue crystallized from acetonitrile. The analytical sample recrystallized from the same solvent has melting point 88–89°C. The acetic acid analog of this compound, where $R'''$ is -$CH_2COOH$, may be prepared employing the methyl acetate analog of compound (XX) in the reaction.

EXAMPLE 32

Preparation of dl-2,3,4,4aβ,4bα,5,6,7,8,8a-decahydro-8aβ-methyl-8β-benzyloxy-2-oxo-phenanthrene-1-propionic acid (XXI, $R_2$=$CH_3$, $R'$=$CH_2C_6H_5$, $R'''$=$CH_2CH_2COOH$)

This is prepared from the crude methyl trans-1-formyl-1,2,4a,5,6,7,8,8a-octahydro-4a-methyl-5-benzyloxy-δ,2-dioxo-1-naphthaleneheptanoate described in Example 27 in 15 ml. dioxane and 30 ml. of a 1.6M solution of sodium hydroxide as described in Example 31. The product, dl-2,3,4,4aβ,4bα,5,6,7,8,8a-decahydro-8aβ-methyl-8β-benzyloxy-2-oxo-phenanthrene-1-propionic acid is obtained as a crystalline solid. Recrystallization from acetonitrile gives an analytical sample melting point 158°-159°C.

EXAMPLE 33

Preparation of dl-8β-t-butoxy-8aβ-methyl-4,4aβ,4bα,5,6,7,8,8a,-9,10-decahydro-2(3H)-phenanthrone, (XXII wherein $R_2$ is $CH_3$, $R'$ is $C(CH_3)_3$, $R'''$ is H)

A suspension of 25 mg. of 2% palladium hydroxide on strontium carbonate in 5 ml. dry benzene is reduced with hydrogen at atmospheric pressure. When the reduction is complete 54.4 mg. of dl-8β-t-butoxy-8aβ-methyl-4,4aβ,4bα,5,6,7,8,8a-octahydro-2(3H)-phenanthrone is added and the reduction continued. After 7 minutes, 4.54 ml. of hydrogen has been absorbed and there is no further absorption. The catalyst is removed by filtration and the solvent removed under reduced pressure. The residue crystallized and the solid is recrystallized from hexane at −10°C. to give dl-8β-t-butoxy-8aβ-methyl-4,4aβ,4bα, 5,6,7,8,8a, 9,10-decahydro-2(3H)-phenanthrone, melting point 97°-98°C.

EXAMPLE 34

Preparation of dl-8β-benzyloxy-8aβ-methyl-4,4aβ,4bα,5,6,7,8,8a,-9,10-decahydro-2(3H)-phenanthrone (XXII, wherein $R_2$ is $CH_3$, $R'$ is $CH_2C_6H_5$ and $R'''$ is H)

Reduction of 43.7 mg. of dl-8β-benzyloxy-8aβ-methyl-4,4aβ,4bα,5,6,7,8,8a-octahydro-2(3H)-phenanthrone in benzene with 25 mg. of 2% palladium hydroxide on strontium carbonate as described in Example 33 gives dl-8β-benzyloxy-8aβ-methyl-4,4aβ,-4bα,5,6,7,8,8a,9,10-decahydro-2(3H)-phenanthrone, melting point 101°-102°C.

EXAMPLE 35

Preparation of dl-8β-benzyloxy-2,3,4,4aβ4bα, 5,6,7,8-,8a,9,10-dodecahydro-8aβ-methyl-2-oxo-phenanthrene-1-propionic acid (XXI wherein $R_2$ is $CH_3$, $R'$ is $CH_2C_6H_5$ and $R'''$ is $CH_2CH_2COOH$)

A suspension of 1.0 g. of 2% palladium hydroxide on strontium carbonate is reduced in 30 ml. water with hydrogen at atmospheric pressure and room temperature. A solution of 3.94 g. of dl-8β-benzyloxy-2,3,4,4aβ,4bα, 5,6,7,8,8a-decahydro-8aβ-methyl-2-oxo-phenanthrene-1-propionic acid in 10 ml. of 1N sodium hydroxide is added. When 1 molar equivalent of hydrogen has been absorbed, the catalyst is removed by filtration and the aqueous phase acidified with dilute hydrochloric acid. The aqueous phase is thoroughly extracted with ether, the ether washed with water, saturated brine, dried and evaporated. The residue (4.0 g.) of crude dl-8β-benzyloxy-2,3,4,4aβ,4bα,5,6,7,8,8a,9,10-dodecahydro-8aβ-methyl-2-oxo-phenanthrene-1-propionic acid is used without further purification.

The procedures detailed in Examples 25 through 35 for the methyl compounds $R_2$=$CH_3$ in generic formulas are equally useful when $R_2$ is $C_2H_5$ and yield the corresponding product. This also applies where $R''$ is methyl acetate (XX) and following reactions yield XXI and XXII where $R'''$ is $CH_2COOH$.

EXAMPLE 36

Preparation of dl-17aβ-benzyloxy-5-hydroxy-3,5-seco-4-nor-5(10),-9(11)-D-homoestradien-3-oic acid, 4,5-lactone (XXIII wherein $R_2$ is $CH_3$ and $R'$ is $CH_2C_6H_5$)

A solution of 4 g. of dl-8β-benzyloxy-2,3,4,4aβ,4bα,-5,6,7,8,8a,9,10-dodecahydro-8aβ-methyl-2-oxo-phenanthrene-1-propionic acid in 40 ml. acetic anhydride and 50 mg. anhydrous sodium acetate is heated under reflux under nitrogen for 4 hours. The solvents are evaporated under reduced pressure and the residue dissolved in ether and water. The aqueous phase is thoroughly extracted with ether, the ether phase combined and washed successively with 1M sodium carbonate solution, water and saturated brine. The ether is separated, dried and evaporated. The residue is crystallized from ether to give dl-17aβ-benzyloxy-5-hydroxy-3,5-seco-4-nor-5(10),9(11)-D-homoestradien-3-oic acid, 3,5-lactone, melting point 130°–131°C.

EXAMPLE 37

Preparation of dl-17aβ-benzyloxy-5-hydroxy-3,5-seco-4-nor-5(10)-D-homoestren-3-oic acid, 3,5-lactone (XXIV, wherein $R_2$ is $CH_3$ and $R'$ is $CH_2C_6H_5$)

A suspension of 0.5 g. of 2% palladium hydroxide on strontium carbonate in 40 ml. dry benzene is reduced with hydrogen at room temperature and atmospheric pressure. Then 1.76 g. of dl-17aβ-benzyloxy-5-hydroxy-3,5-seco-4-nor-5(10),9(11)-D-homoestradien-3-oic acid, 3,5-lactone in 40 ml. dry benzene is added and the reduction continued. During 22 hours, 135 ml. of hydrogen had been absorbd and the catalyst is then removed by filtration and the solvent evaporated. The residue is dissolved in ether and percolated through a plug of florisil. The florisil is washed with more ether and the combined ether solutions evaporated and the residue crystallized from an ether-hexane mixture to give dl-17aβ-benzyloxy-5-hydroxy-3,5-seco-4-nor-5(10)- D-homoestren-3-oic acid, 3,5-lactone, melting point 123–124°C.

EXAMPLE 38

Preparation of dl-19-nor-D-homotestosterone, benzyl ether (XXV wherein $R_2$ is $CH_3$ and $R'$ is $CH_2C_6H_5$)

A solution of 0.5 g. dl-17aβ-benzyloxy-5-hydroxy-3,5-seco-4-nor-5(10)-D-homoestren-3-oic acid, 3,5-lactone in 100 ml. ether and 30 ml. benzene is cooled to −50°C. under nitrogen and 2 ml. of a 3M solution of methyl magnesium bromide in ether is added with stirring over 20 minutes. After stirring a further 1 hour at −50°C., 2N hydrochloric acid is added and the mixture warmed to room temperature. The organic phase is diluted with benzene and the aqueous phase thoroughly extracted. The organic phase is washed with a 1M sodium carbonate solution, water, dried and evaporated to give 0.55 g. of a colorless oil. The oil is dissolved in 15 ml. glacial acetic acid and 1.5 ml. concentrated hydrochloric acid is added. The solution is allowed to stand under nitrogen at room temperature for 48 hours. The solvents are removed under reduced pressure and the residue dissolved in benzene. The benzene is washed with saturated sodium bicarbonate, water, saturated brine, dried and evaporated to give a crystalline residue. This is recrystallized from ethanol to give 300 mg. 19-nor-D-homotesterone, benzyl ether, melting point 185°–188°C. A pure sample is prepared by recrystallization from a chloroform-ethanol mixture. The analytical sample has melting point 194°–195°C.

The procedures outlined in Examples 36, 37 and 38 are equally applicable when $R_2$ in the generic formula is ethyl. In this instance the products are the corresponding ethyl compounds.

I claim:

1. A compound of the formula:

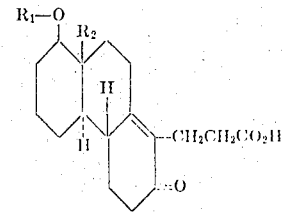

wherein $R_1$ is selected from the group consisting of t-butyl and benzyl, and $R_2$ is lower alkyl.

2. The compound according to claim 1 wherein $R_1$ is benzyl and $R_2$ is methyl; dl-8β-benzyloxy-2,3,4,4aβ,4bα,5,6,7,8,8a9,10-dodecahydro-8aβ-methyl-2-oxo-phenanthrene-1-propionic acid.

* * * * *